United States Patent
Offer

(10) Patent No.: US 6,894,251 B2
(45) Date of Patent: May 17, 2005

(54) METHOD FOR WELDING ON STRESS-SENSITIVE MATERIALS

(75) Inventor: Henry Peter Offer, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 10/232,417

(22) Filed: Sep. 3, 2002

(65) Prior Publication Data

US 2004/0040944 A1 Mar. 4, 2004

(51) Int. Cl.⁷ .............................................. B23K 9/00
(52) U.S. Cl. ......................................... 219/128; 219/72
(58) Field of Search ........................... 219/128, 137 R, 219/125.1, 72; 72/76

(56) References Cited

U.S. PATENT DOCUMENTS

| | | | | |
|---|---|---|---|---|
| 2,062,460 A | * | 12/1936 | Lee | ............................. 219/128 |
| 2,237,716 A | * | 4/1941 | Spaulding | ................... 219/128 |
| 4,491,001 A | * | 1/1985 | Yoshida et al. | ................. 72/76 |
| 6,373,019 B1 | | 4/2002 | Offer et al. | |
| 6,417,476 B1 | | 7/2002 | Offer et al. | |

* cited by examiner

Primary Examiner—Clifford C. Shaw
(74) Attorney, Agent, or Firm—Nixon & Vanderhye

(57) ABSTRACT

For stress-crack-sensitive materials, a weld pool is formed on a substrate. The weld pool is simultaneously plastically strained and cooled while the temperature of the hot metal weld pool lies substantially within a predetermined range in which hot cracking typically occurs. The hot metal is plastically strained and cooled until the temperature of the weld material is below the predetermined temperature range associated with hot cracking or until residual stresses in the weld are sufficiently low to preclude cracking in the completed weld.

10 Claims, 7 Drawing Sheets

METHOD FOR WELDING ON STRESS-SENSITIVE MATERIALS

BACKGROUND OF THE INVENTION

The present invention relates generally to welding and particularly to welding on stress-crack sensitive materials to reduce or eliminate hot cracking and reduce or eliminate stress corrosion cracking.

There are various types of conventional fusion welding processes, such as electric arc, laser beam, or electron beam welding. In those processes, a molten pool of hot metal is formed, either by melting a substrate or adding a filler metal, or both. Materials, however, are oftentimes sensitive to hot cracking. Hot cracking of the welded surface is typically caused by strains and stresses due to contraction on cooling, i.e., during the phase change from liquid hot metal to a solid state. An extreme but actual example of hot cracking sensitive materials is fusion welding on material containing higher levels of helium, such as in permanent portions of older nuclear reactor vessel internals near the fuel core. In neutron irradiated austenitic stainless steels with significant boron content (which is susceptible to transmutation to helium), the helium in the weld materials causes several adverse effects through changes in mechanical properties. For example, when high helium content materials are exposed to the heat of a welding cycle, the high temperature allows the helium to diffuse rapidly to grain boundaries which form voids which, in turn, weaken the material resulting in hot cracking. Even for known low heat input fusion welding processes, the capability to reliably weld without hot cracking is limited to materials having relatively low helium levels. Hot cracking is also not limited to materials having a helium content but constitutes only one type of material in which hot cracking occurs. The hot cracking problem is also compounded by the typically high tensile temporal and residual surface stresses caused by the fusion processes. This adverse stress situation in the as-welded condition is characteristic of all conventional fusion welding processes and applications, especially for the heavy section thicknesses of materials generally found in permanent nuclear vessel internals and for the vessel wall itself or its attachments. It is effectively impossible to provide sufficiently low heat in the fusion welding process to avoid hot cracking, while still having a viable fusion welding process.

In addition to the hot cracking problem during cooling of the weld pool, stress corrosion cracking (SCC) can occur in materials susceptible to thermal or neutron sensitization when used in aggressive environments such as oxygen or halogen containing high temperature nuclear reactor water or moderator. This type of environmentally induced cracking occurs when the level of surface residual stress becomes sufficiently tensile as is typically the case for conventional fusion welding practice.

BRIEF DESCRIPTION OF THE INVENTION

In accordance with a preferred embodiment of the present invention, there is provided apparatus and methods for welding on stress crack sensitive materials which minimizes or eliminates the problem of stress cracking in the resulting weld. To accomplish the foregoing, hot viscous or plastic weld material is formed on a solid substrate by conventional fusion welding apparatus, typically including a heat source, and which may include the addition and melting of filler material as well as melting of a portion of the substrate. The process includes simultaneous hot compression with or without concurrent heat sinking of the weld. Preferably, compression force and heat sinking are simultaneously applied to the hot weld deposit during progression of the weld pass.

More particularly, plastic deformation of the hot weld metal is provided by controlled contact with a compression tool. External cooling, in addition to the inherent internal conduction to the hot surrounding material, is simultaneously provided to the weld area by contact with the conductive end of the compression tool, while the pressure of the compression tool is maintained against the weld pool. The predetermined compression and external heat sinking conditions are maintained on the weld area until the weld material is known or measured to be below its predetermined hot crack sensitive temperature or until the residual stress is sufficiently low to preclude in-service cracking. Additional cooling may be applied once outside the range of temperatures at which hot cracking is anticipated to occur, with the result that the weld surface has reduced tensile and preferably compressive stresses.

The foregoing method is also applicable to minimizing or eliminating post-weld stress corrosion cracking. By plastically compressively stressing the hot weld material when the hot weld material lies within a predetermined temperature range corresponding to the hot crack-sensitive predetermined temperature range, any tendency toward stress corrosion cracking in the completed weld is minimized or eliminated.

In a preferred embodiment according to the present invention, there is provided a method of welding materials while the materials are in a hot crack-sensitive predetermined temperature range comprising the steps of (a) forming hot metal weld material on a portion of a substrate, (b) plastically compressively stressing the hot metal weld material from an external source while the temperature of the hot metal weld material lies substantially within the predetermined temperature range and (c) performing step (b) until the temperature of the weld material is below the predetermined temperature range or until residual stresses are sufficiently low to minimize or preclude hot cracking in the completed weld.

In a further preferred embodiment according to the present invention, there is provided a method of welding materials while the materials are in a crack-sensitive predetermined temperature range comprising the steps of (a) forming hot metal weld material on a portion of a substrate, (b) simultaneously plastically straining and cooling the hot metal weld material from an external source while the temperature of the hot metal weld material lies substantially within the predetermined temperature range and (c) performing step (b) until the temperature of the weld material is below the predetermined temperature range or until residual stresses are sufficiently low to preclude cracking in the completed weld.

In a further preferred embodiment according to the present invention, there is provided a method of welding materials while the materials are in a predetermined temperature range to minimize or eliminate post-weld stress corrosion cracking comprising the steps of (a) forming hot metal weld material on a portion of a substrate, (b) plastically compressively stressing the hot metal weld material from an external source while the temperature of the hot metal weld material lies substantially within the predetermined temperature range and (c) performing step (b) until the temperature of the weld material is below the predetermined temperature range or until residual stresses are sufficiently low to minimize or preclude stress corrosion cracking in the completed weld.

In a further preferred embodiment according to the present invention, there is provided a method of welding materials while the materials are in a predetermined temperature range to minimize or eliminate post-weld stress corrosion cracking comprising the steps of (a) forming hot metal weld material on a portion of a substrate, (b) simultaneously plastically compressively stressing and cooling the hot metal weld material from an external source while the temperature of the hot metal weld material lies substantially within the predetermined temperature range and (c) performing step (b) until the temperature of the weld material is below the predetermined temperature range or until residual stresses are sufficiently low to minimize or preclude cracking in the completed weld.

DETAILED DESCRIPTION OF THE INVENTION

Figure 1:
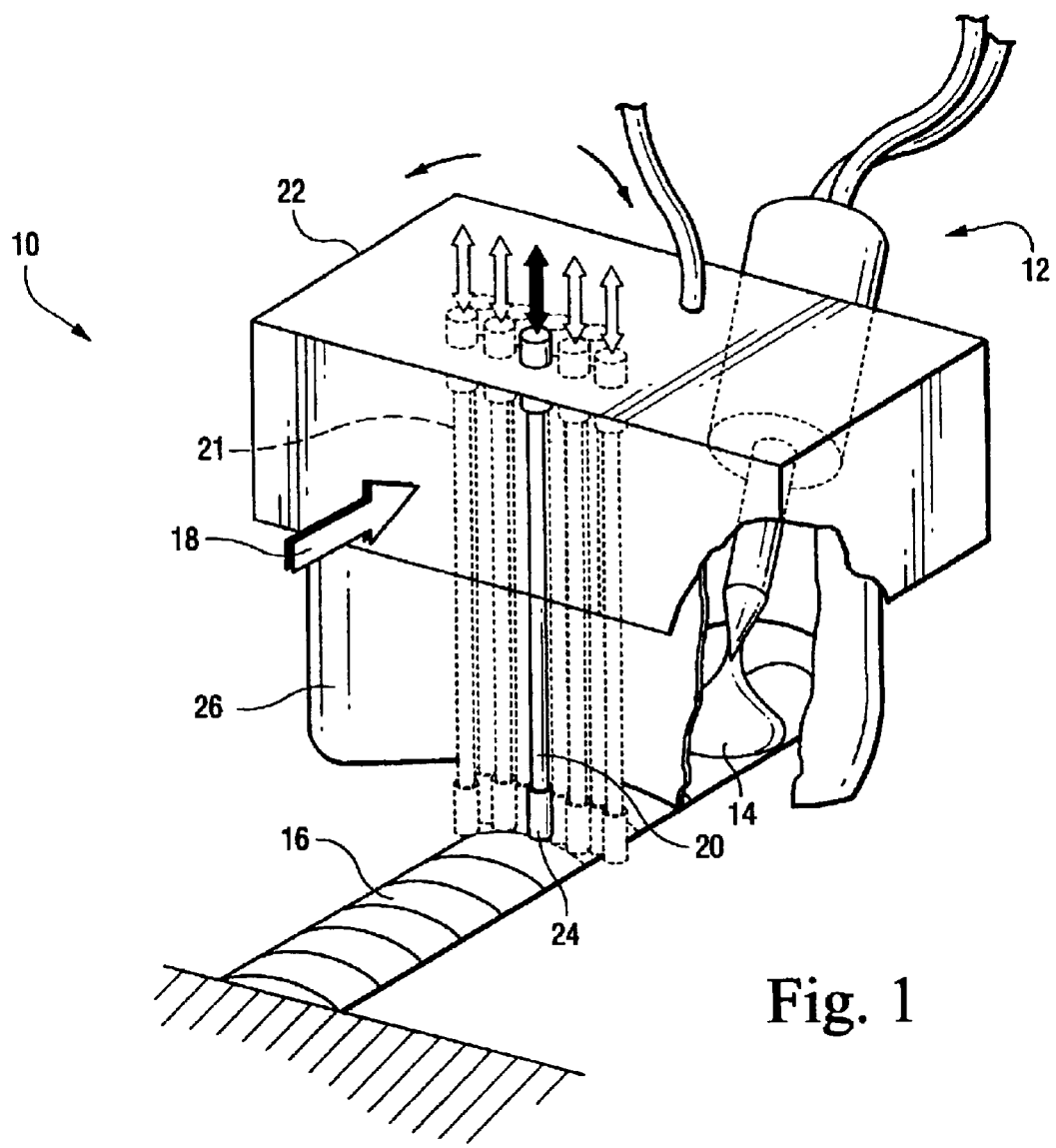
FIG. 1 is a schematic illustration of a combined compression and heat sinking tool for welding stress crack sensitive materials according to a preferred embodiment of the present invention.

Referring now to the drawings, particularly to FIG. 1, there is illustrated a combined compression and heat sinking tool generally designated 10 in conjunction with a welding heat source generally indicated 12. The welding heat source may be any type of fusion welding heat source; for example, electric arc, laser beam or electron beam and with or without added weld material. The heat source 12 is illustrated forming, with or without added weld material, a weld pool 14 eventually forming a weld bead 16. The weld bead 16 may be applied at the juncture of two adjoining parts to secure the parts one to the other, or may be provided in an overlying manner to a surface to provide a cladding. It will be appreciated from a review of FIG. 1 that the direction of the welding is in the direction of the arrow 18.

Tool 10 includes a multiple element compression tool 21 comprising a plurality of pins or needles 20 carried by a housing 22. By means not shown, the needles or pins 20 are mounted for multiple repetitive reciprocating movement such that the pin or needle heads 24 repeatedly impact the surface of the hot weld nugget while the weld material holds a temperature within a predetermined temperature range in which the weld material is sensitive to stress-crack formation. Thus, as the weld progresses in the direction of arrow 18, the pins or needle heads 24 repeatedly hammer or peen the surface of the hot weld nugget to plastically deform the surface of the hot weld material as the strain level of the stress/strain curve moves into the plastic region. The near surface material of the weld thus goes into the plastic region of the stress/strain curve and contains the compressive stress supplied by the pins or needles 20. The needles or pins may be reciprocated by any known means such as electrical, mechanical or fluid, e.g., pneumatic or hydraulic means.

In order to accommodate the shape of the weld, the housing including the needles or pins 20 may be displaced, for example, oscillated in a direction generally normal to the direction of welding. Thus, the pin or needle heads 24 may be oscillated side-to-side to provide direct perpendicular impacts on the surface of the weld material 16 where the weld pool has an arcuate exposed surface as illustrated. It will be appreciated that purge gas is typically utilized in conjunction with the welding torch or heat source 12. A curtain 26 is disposed between the heat source 12 and the pins or needles 20 to confine the purge gas in the area of the welding torch.

In order to provide heat sinking simultaneously with the compressive impact of the pins or needle heads 24 on the surface of the weld material 16, the needle or pin heads form a conductive heat sink for the weld material. Cooling flows may be provided through passages within the individual pins or needles to cool the heads. Thus, the weld material is simultaneously cooled as the multiple element compression tool 21 repeatedly impacts the surface of the weld material.

Figure 2:
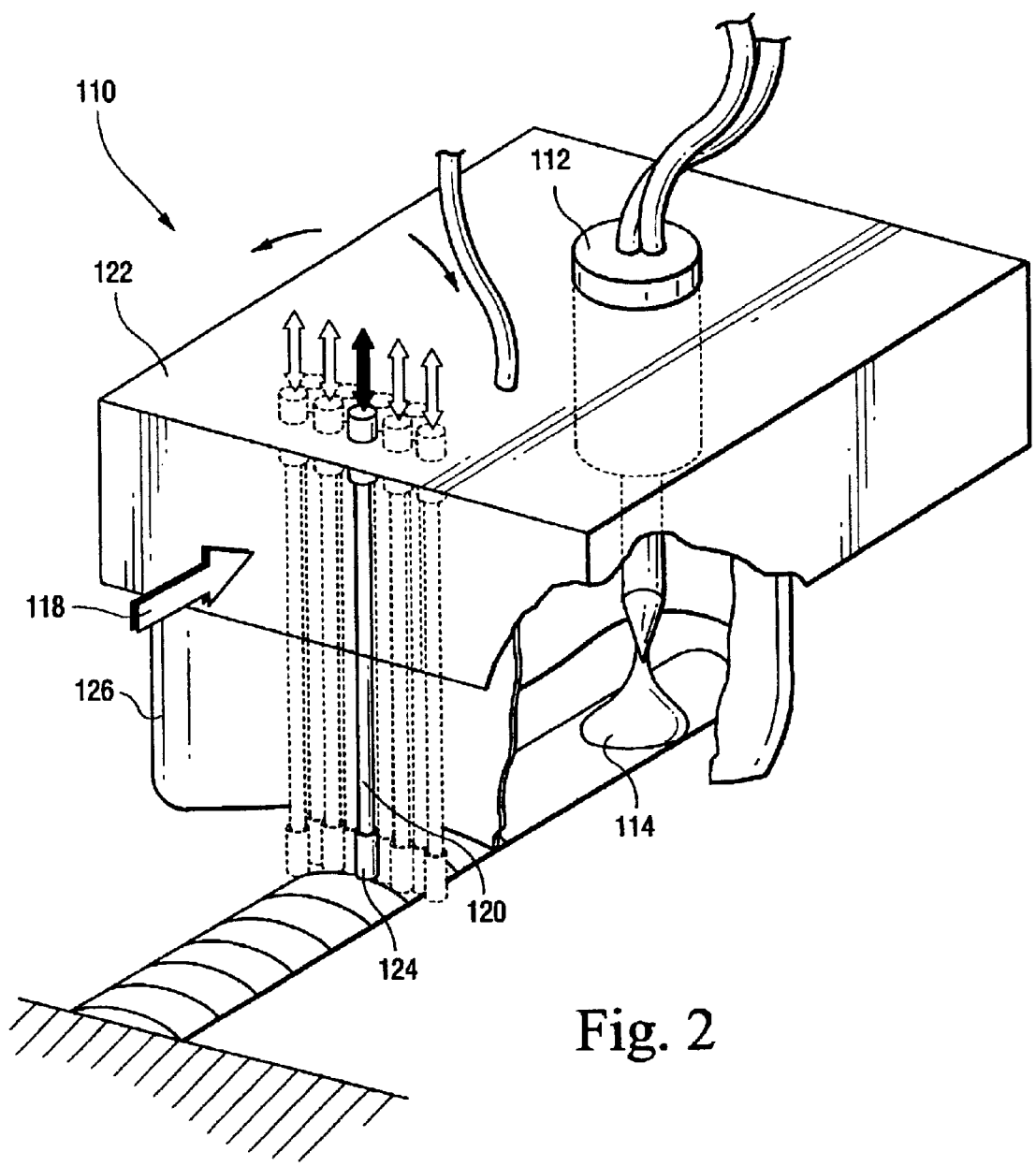
FIG. 2 is a view similar to FIG. 1 illustrating an integrated welding and deforming assembly.

In FIG. 2, a similar arrangement of a combination compression and heat sinking tool with welding heat source is provided and wherein like reference numerals are applied to like parts as in the preceding embodiment preceded by the numeral 1. In this embodiment, the housing 122 is extended to incorporate the heat source, i.e., the welding torch 112. Thus an integrated compression cooling and weld assembly is provided. Consequently, the welding torch 112 and the compression and heat sinking tool 110 move jointly in the direction of the weld 118.

Figure 3:
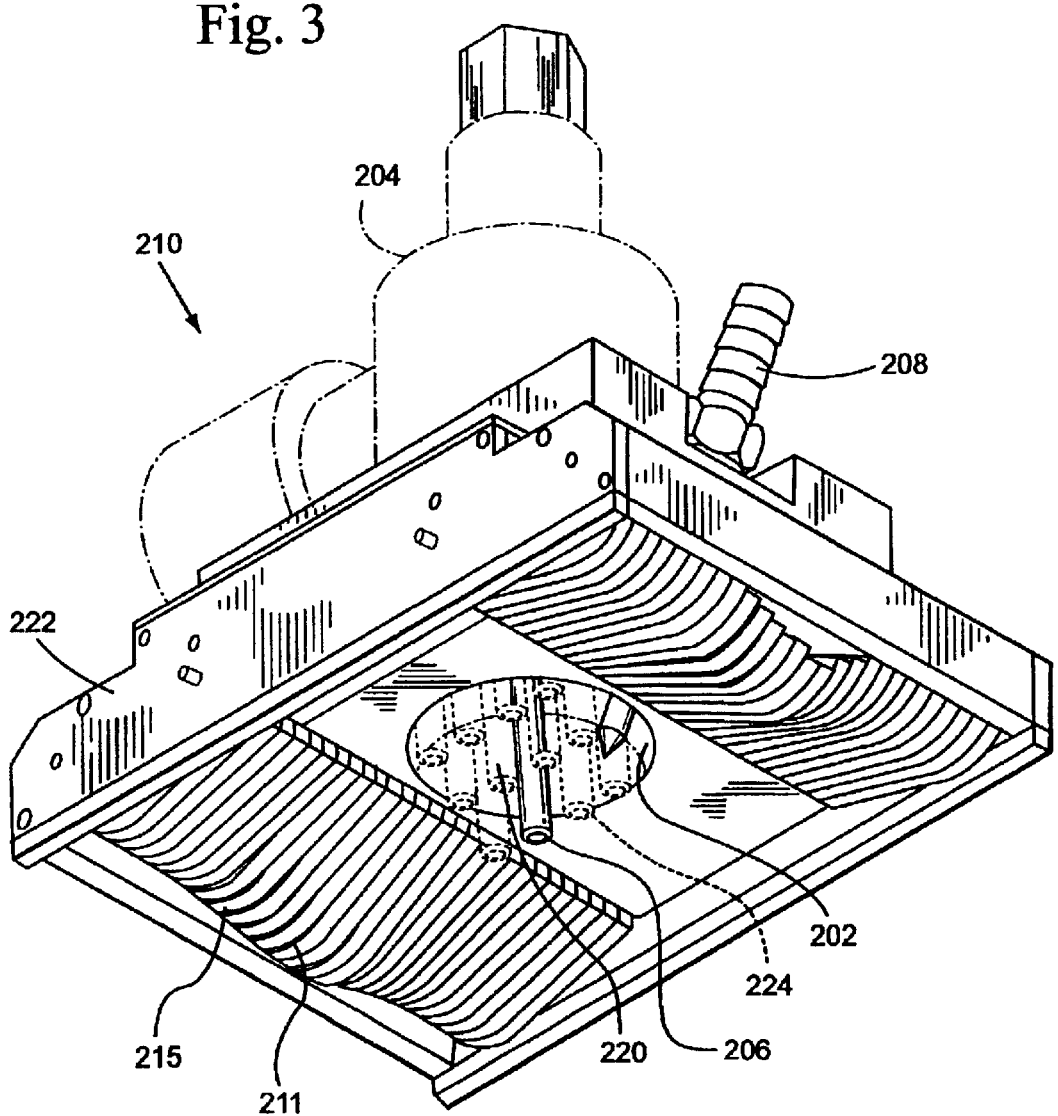
FIG. 3 is a perspective view of an embodiment of the invention employed for underwater welding.

Referring now to FIG. 3, there is illustrated a mobile apparatus for a combined compression and heat sinking tool for the welding torch for use in an underwater environment. In this embodiment, like reference numerals are applied to like parts as in the embodiments of FIG. 1 preceded by the numeral 2. In this embodiment, the apparatus includes a housing 222 closed at its top side and ends and having a central opening 202 along its lower face within the confines of the sides and ends of the housing 222, the applicator head 204 attached to the housing 222 includes a heat source 212 comprised of a welding torch 206 and a coupling 208 for supplying purge gas to the opening 202 in the region of the weld material. The housing 222 also carries a plurality of needles or pins 220 similar to the pins 20 and 120 of the prior embodiments having pin or needle heads 224 which extend through the opening 202. The pins 220 conduct heat away from the weld head and may have internal passages for flowing a cooling fluid to carry the heat away from the weld head.

The housing 222 also includes a plurality of individually or independently movable fingers 211 on opposite sides of the housing 222 and which fingers are pivotable about generally parallel axes. Each finger 211 includes a large radius tip 215 and is spring-biased by springs, not shown, into an extended pivoted position to engage a work surface. It will also be appreciated that as the tool 210 is displaced; for example, along a groove and in the direction of the groove, i.e., parallel to the longitudinal extent of the fingers 211, the fingers 211 follow the contour of the working surface. Also, the side walls and fingers of the housing form an exclusion area inhibiting egress of water into the opening and enabling operation of the torch. The pin or needle heads 224 are mounted for repeated reciprocating movement so that the heads impact the surface of the hot weld material simultaneously while the heads cool the weld material.

Figure 4:
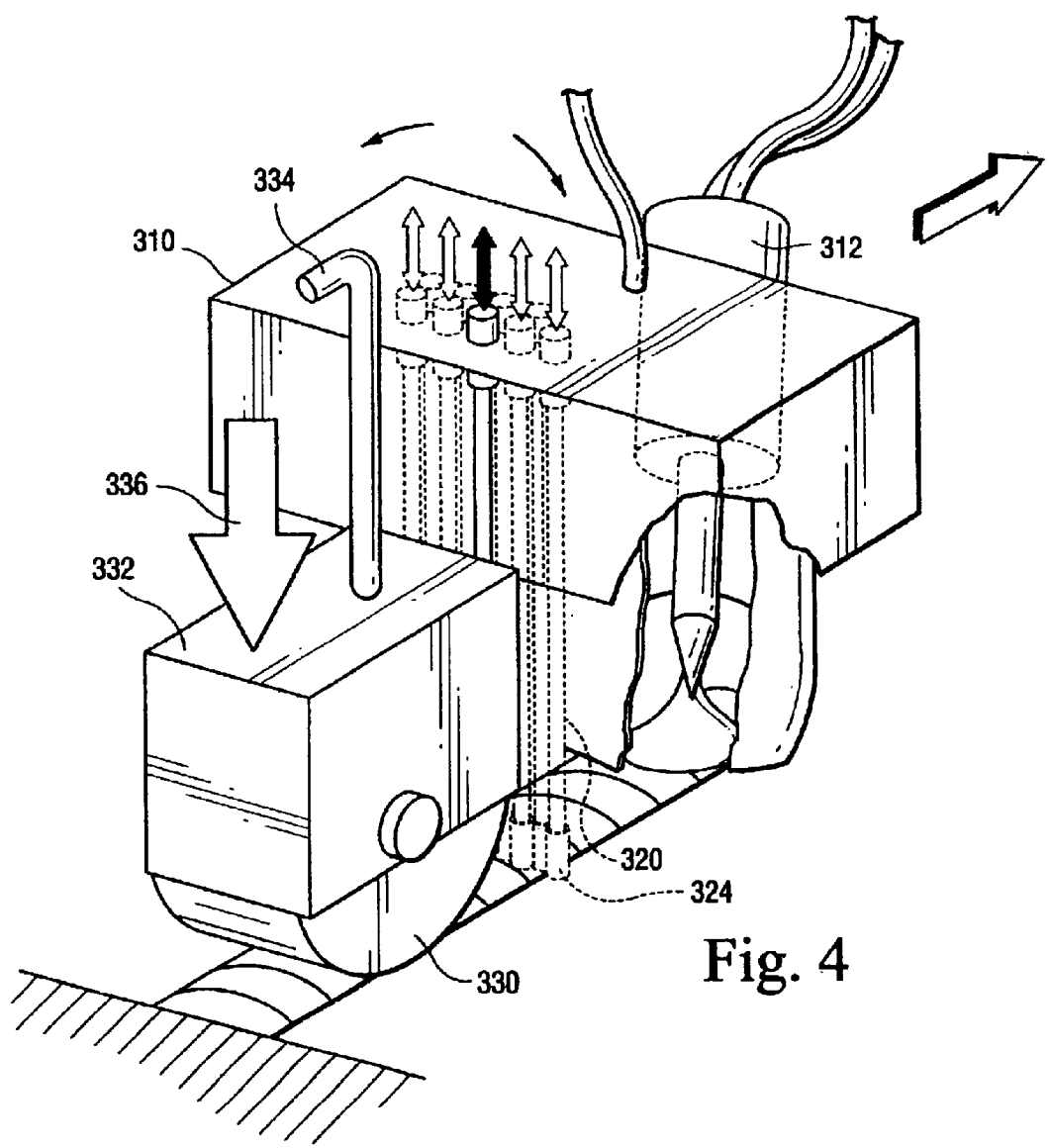
FIG. 4 is a schematic illustration similar to FIG. 1 showing a further embodiment of the present invention.

Referring now to the embodiment hereof illustrated in FIG. 4 wherein like reference numerals are applied to like parts as in the embodiment of FIG. 1 preceded by the reference numeral 3, there is illustrated a housing 310 mounting pins or needles 320 having heads 324 for impacting and cooling the surface of the weld material. The welding heat source 312 is illustrated separate from the housing 310 but may be integral therewith as illustrated in FIG. 2. The needle or pin motion, i.e., transverse oscillatory motion relative to the direction of welding, is similar to that described with respect to FIG. 1.

In FIG. 4, however, the cooling effect of the heads 324 of the pins 320 is augmented by a following cooling distribution flexible disk 330. The disk is mounted for rotation in a supplementary housing 332 which may be attached to housing 310. In this form, a liquid coolant 334 is supplied to the housing 332 and into the wheel or disk 330. Additionally, a constant pressure force is applied to the housing 332 in the direction of the arrow 336 such that the disk 330 applies a continuous and constant pressure on the surface of the weld material at a location substantially immediately following the location of the impacts of the pin or needle heads 324 on the surface of the weld material. This cooling augmentation is provided while the temperature of the weld material lies within the range of temperature during welding which typically leads to stress-cracking in the resulting weld.

Figures 5, 6:
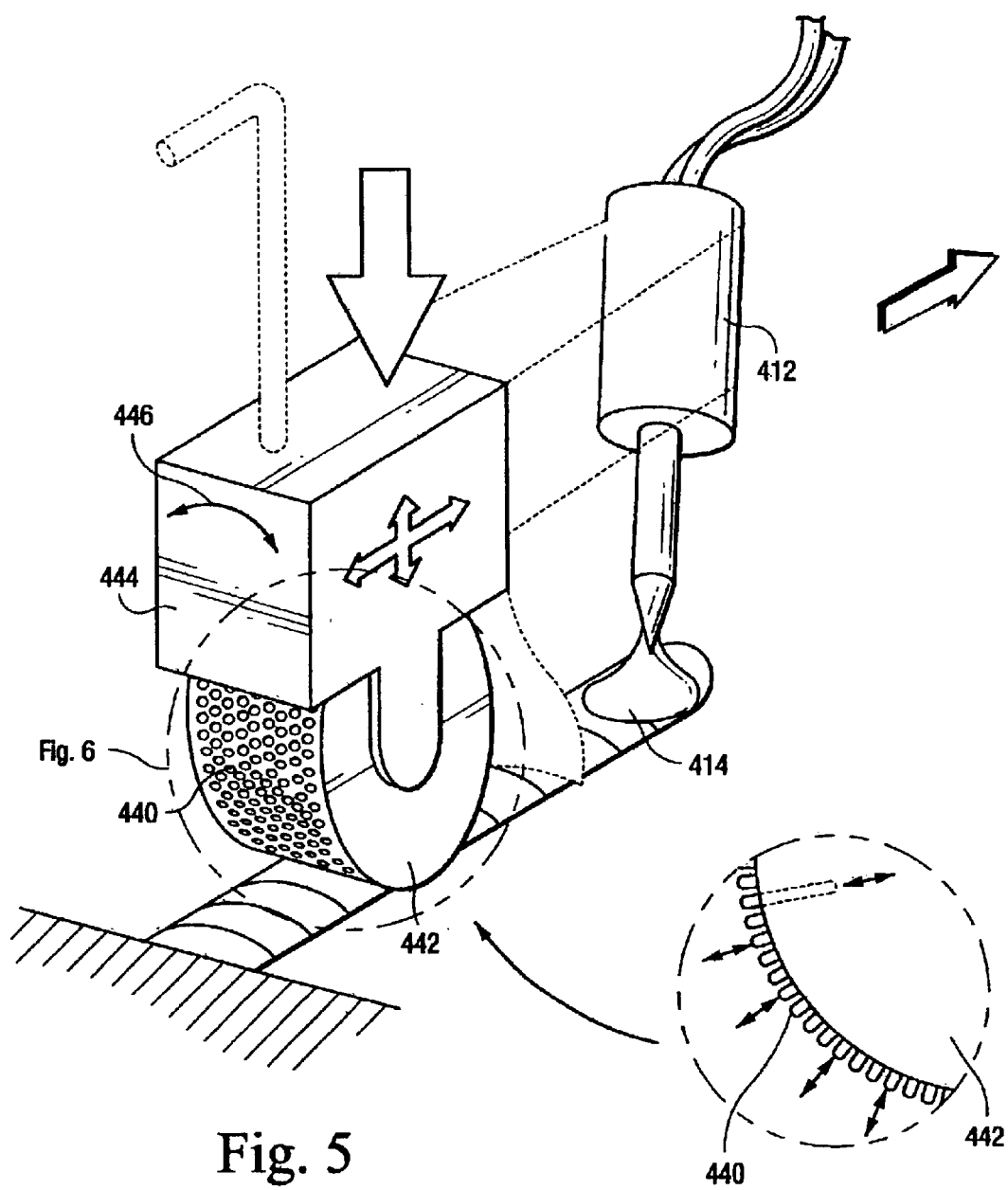
FIG. 5 is a schematic illustration similar to FIG. 1 of a compression and heat sinking tool for continuous application of point-wise surface and heat sinking.
FIG. 6 is an enlarged fragmentary perspective view of the portion of the roller in FIG. 5.

Referring now to FIG. 5, wherein like reference numerals are applied to like parts as in the embodiment of FIG. 1 preceded by the numeral 4, the welding torch or heat source 412 forms the molten pool 414 similarly as in FIG. 1. However, instead of compressing the welding material employing multiple impact pins or needles, the weld material is repetitively pounded or hammered by multiple pins 440 mounted on a drum 442. The pins 442 are mounted for repetitive axial extension and retraction; for example, by internal springs. The movement of the housing 444 carrying the drum 442 is transversely oscillatory in the direction of the arrow 446 as the housing advances in following movement relative to the heat source 412. The housing 444 may also be mounted for vertical reciprocating movement in a direction normal to the weld surface. Thus, the weld surface is dimpled by the pins 440 and the motion of the wheel 442 provides for an overlapping of the dimpling effect in the surface of the weld material to compress the weld material. The multiple pins 440 carried by the wheel 442 also provide conductive cooling to the weld surface.

Figures 7, 8:
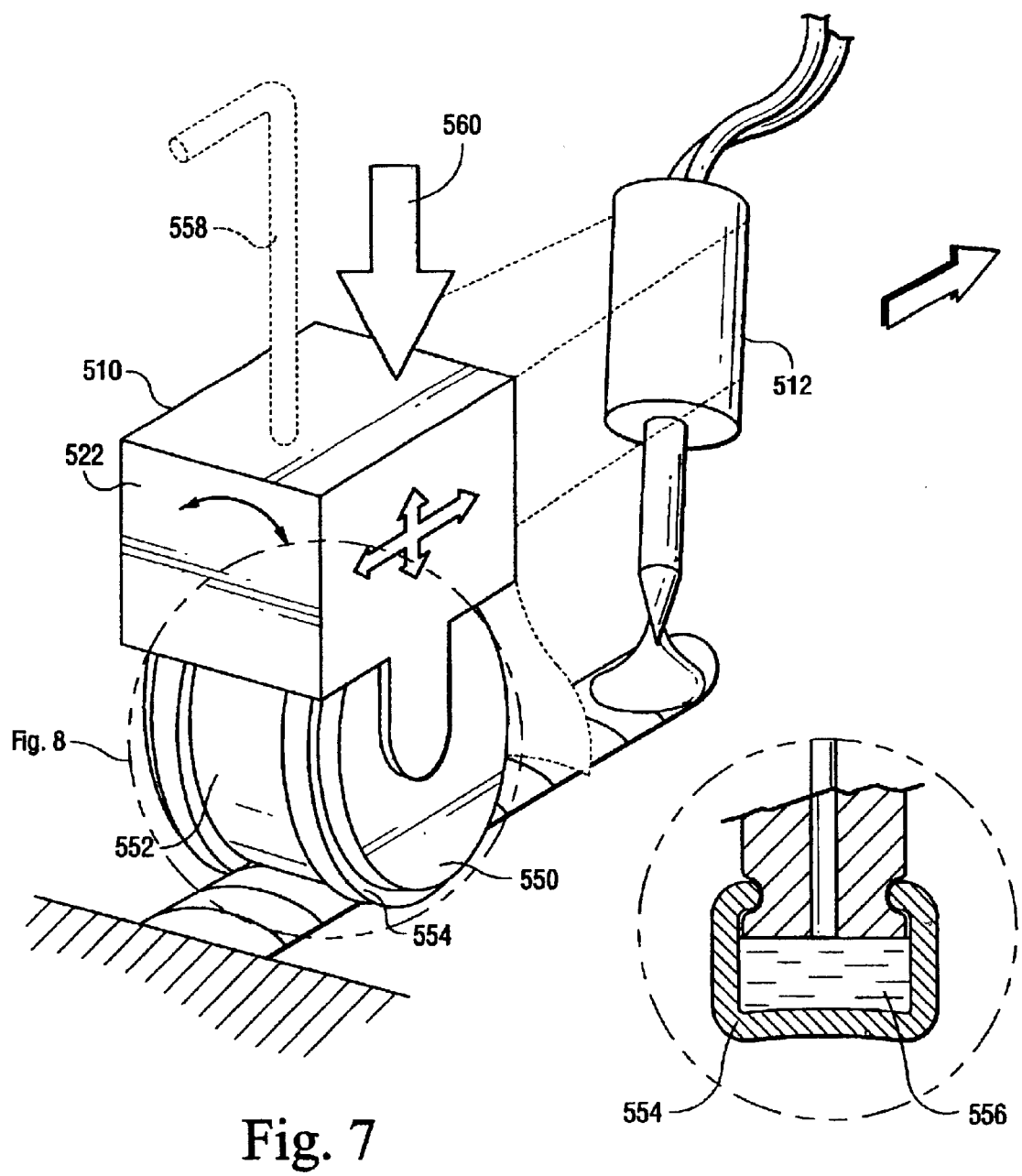
FIG. 7 is a schematic representation similar to FIG. 1 of a compression and heat sinking tool for continuous application of an area-wide surface compression and heat sinking.
FIG. 8 is an enlarged fragmentary cross-sectional view of a portion of the roller of FIG. 7.

Referring now to FIGS. 7 and 8, there is illustrated a further embodiment of the present invention wherein like reference numerals are applied to like parts as in the embodiment of FIG. 1 preceded by the numeral 5. In this form, the compression and heat sinking tool 510 follows the weld heat source 512 similarly as in the prior embodiments. The housing 522 mounts a disk 550 for rotational movement about an axis transverse to the direction of movement of the tool 510. The central portions of the disk 550 include a hard conductive material for planishing the weld material. Straddling the cylindrical surface of the hard planishing material are compliant rims 554. Rims 554, as illustrated in FIG. 8, receive a coolant 556 by way of a coolant inlet 558 to housing 522 and wheel 550. The central portion 552 of the wheel 550 is formed of a hard material which provides a heat sink for the hot weld material. In addition, the annular rims cool the margins of the weld material and distribute a cooling effect to the central portion of the wheel. In this form, the housing has an applied downward force indicated by the arrow 560. As the housing 522 moves in the direction of the weld, the planishing wheels deform the weld material plastically while simultaneously cooling the weld material in conjunction with the coolant provided by the annular rims. As in the embodiment of FIG. 1, the tool 510 may be oscillated in a transverse direction relative to the direction of travel of the tool along the weld head.

Figure 10:
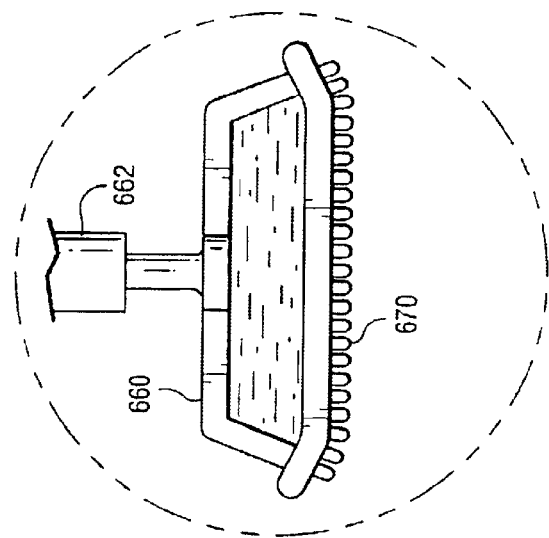
FIG. 10 is an enlarged fragmentary view of the head of the tool of FIG. 9.
Figure 9:
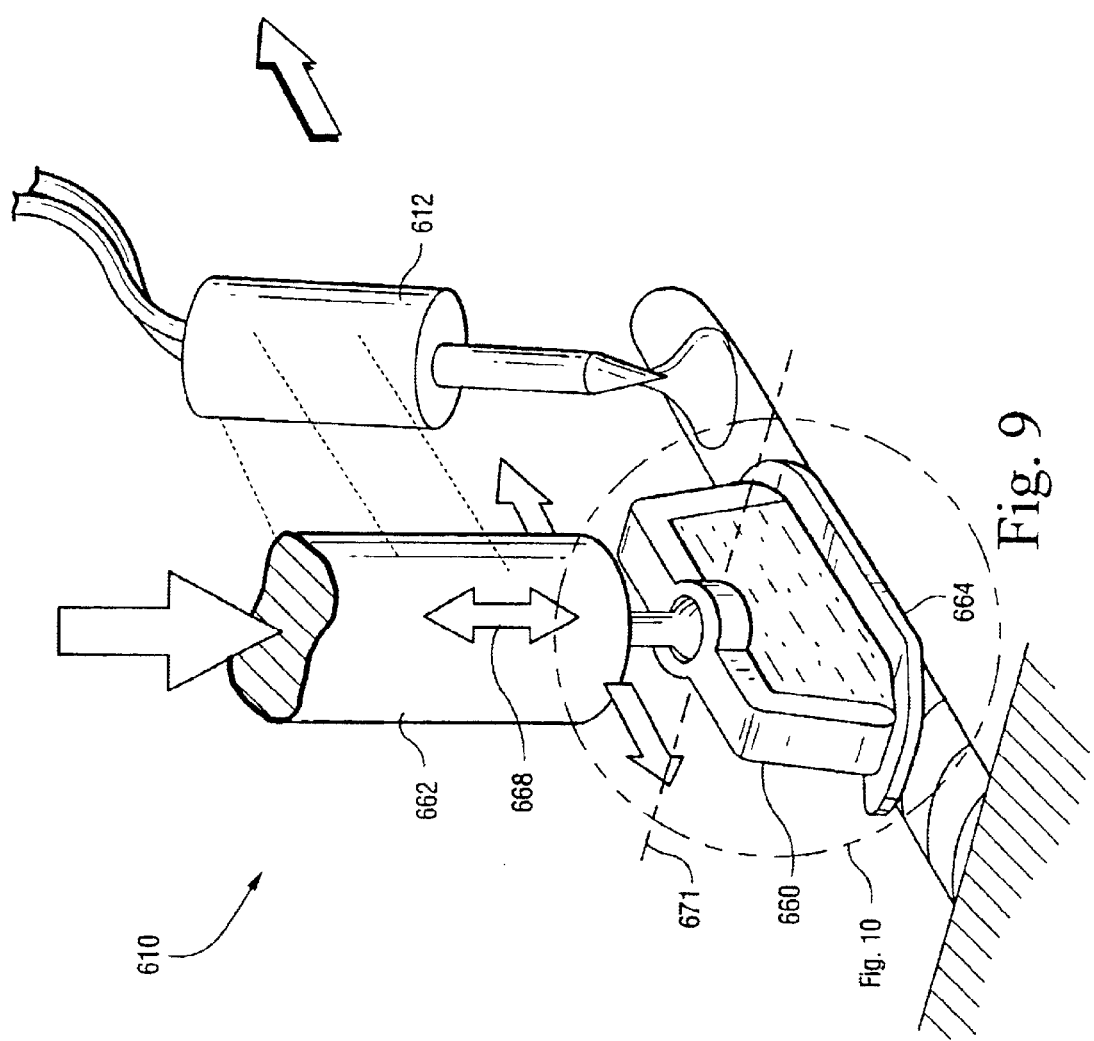
FIG. 9 is a schematic illustration similar to FIG. 1 illustrating a compression and heat sinking tool for intermittently applying broad surface area compression and heat sinking.

Referring now to the embodiment illustrated in FIGS. 9 and 10, wherein like reference numerals are applied to like parts as in the embodiment of FIG. 1 preceded by the numeral 6, there is illustrated a heat source 612 for providing a molten weld pool. The compression and heat sinking tool 610 in this form comprises a shoe 660. The shoe is in the form of a receptacle containing a coolant supplied to the housing 662 and shoe 660. The shoe 660 has a elongated lower contact surface 664 which mounts a plurality of pins 670 fixed to the surface. The housing 662 may be reciprocated in a direction normal to the weld bead as indicated by the arrow 668 as the weld progresses in the direction of the weld pass. The housing 662 may also be provided with an oscillatory reciprocating motion in the direction of the weld, i.e., an oscillatory motion about a transverse axis 671 as well as a side-by-side oscillatory motion similarly as in the preceding embodiments. It will be appreciated, therefore, that the pins 670 mounted on the bottom of the contact surface 664 repeatedly impact the surface of the weld material. Additionally, a coolant is supplied through the housing 662 to the shoe 660. Thus, the heat sinking can be performed simultaneously with the compressive action of the pins 670 on the weld surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding materials while the materials are in a hot crack-sensitive predetermined temperature range comprising the steps of:
   (a) forming hot metal weld material on a portion of a substrate;
   (b) plastically compressively stressing the hot metal weld material from an external source while the temperature of the hot metal weld material lies substantially within the predetermined temperature range;
   (c) performing step (b) until the temperature of the weld material is below the predetermined temperature range or until residual stresses are sufficiently low to minimize or preclude hot cracking in the completed weld; and
   (d) wherein steps (a), (b) and (c) are performed under water.

2. A method of welding materials while the materials are in a hot crack-sensitive predetermined temperature range comprising the steps of:
  (a) forming hot metal weld material on a portion of a substrate;
  (b) plastically compressively stressing the hot metal weld material from an external source while the temperature of the hot metal weld material lies substantially within the predetermined temperature range;
  (c) performing step (b) until the temperature of the weld material is below the predetermined temperature range or until residual stresses are sufficiently low to minimize or preclude hot cracking in the completed weld; and
  (d) wherein the step of plastically compressively straining includes periodically impacting multiple pins against the weld surface by engaging a roller mounting said pins against the weld surface.

3. A method of welding materials while the materials are in a crack-sensitive predetermined temperature range comprising the steps of:
  (a) forming hot metal weld material on a portion of a substrate;
  (b) simultaneously plastically straining and cooling the hot metal weld material from an external source while the temperature of the hot metal weld material lies substantially within the predetermined temperature range; and
  (c) performing step (b) until the temperature of the weld material is below the predetermined temperature range or until residual stresses are sufficiently low to preclude cracking in the completed weld and
  (d) wherein steps (a), (b) and (c) are performed underwater.

4. A method of welding materials while the materials are in a crack-sensitive predetermined temperature range comprising the steps of:
  (a) forming hot metal weld material on a portion of a substrate;
  (b) simultaneously plastically straining and cooling the hot metal weld material from an external source while the temperature of the hot metal weld material lies substantially within the predetermined temperature range;
  (c) performing step (b) until the temperature of the weld material is below the predetermined temperature range or until residual stresses are sufficiently low to preclude cracking in the completed weld; and
  (d) wherein the step of plastically straining includes impacting multiple pins against the weld surface and flowing a cooling medium through the pins.

5. A method of welding materials while the materials are in a crack-sensitive predetermined temperature range comprising the steps of:
  (a) forming hot metal weld material on a portion of a substrate;
  (b) simultaneously plastically straining and cooling the hot metal weld material from an external source while the temperature of the hot metal weld material lies substantially within the predetermined temperature range;
  (c) performing step (b) until the temperature of the weld material is below the predetermined temperature range or until residual stresses are sufficiency low to preclude cracking in the completed weld; and
  (d) wherein the step of plastically straining includes periodically impacting multiple pins against the weld surface by engaging a roller mounting said pins against the weld surface.

6. A method of welding materials while the materials are in a predetermined temperature range to minimize or eliminate post-weld stress corrosion cracking comprising the steps of:
  (a) forming hot metal weld material on a portion of a substrate;
  (b) plastically compressively stressing the hot metal weld material from an external source while the temperature of the hot metal weld material lies substantially within the predetermined temperature range;
  (c) performing step (b) until the temperature of the weld material is below the predetermined temperature range or until residual stresses are sufficiently low to minimize or preclude stress corrosion cracking in the completed weld;
  (d) wherein the step of plastically compressively straining is performed by periodically impacting the surface of the hot metal material while the temperature of the hot metal weld material lies substantially within the predetermined temperature range; and
  (e) wherein steps (a), (b) and (c) are performed underwater.

7. A method of welding materials while the materials are in a predetermined temperature range to minimize or eliminate post-weld stress corrosion cracking comprising the steps of:
  (a) forming hot metal weld material on a portion of a substrate;
  (b) plastically compressively stressing the hot metal weld material from an external source while the temperature of the hot metal weld material lies substantially within the predetermined temperature range;
  (c) performing step (b) until the temperature of the weld material is below the predetermined temperature range or until residual stresses are sufficiently low to minimize or preclude stress corrosion cracking in the completed weld;
  (d) wherein the step of plastically compressively straining is performed by periodically impacting the surface of the hot metal material while the temperature of the hot metal weld material lies substantially within the predetermined temperature range; and
  (e) wherein the step of plastically straining includes periodically impacting multiple pins against the weld surface by engaging a roller mounting said pins against the weld surface.

8. A method of welding materials while the materials are in a predetermined temperature range to minimize or eliminate post-weld stress corrosion cracking comprising the steps of:
  (a) forming hot metal weld material on a portion of a substrate;
  (b) simultaneously plastically compressively stressing and cooling the hot metal weld material from an external source while the temperature of the hot metal weld material lies substantially within the predetermined temperature range; and
  (c) performing step (b) until the temperature of the weld material is below the predetermined temperature range or until residual stresses are sufficiently low to minimize or preclude cracking in the completed weld;

(d) wherein the step of plastically compressively straining is performed by periodically impacting the surface of the hot metal weld material while cooling to plastically deform the surface; and (e) wherein steps (a), (b) and (c) are performed underwater.

9. A method of welding materials while the materials are in a predetermined temperature range to minimize or eliminate post-weld stress corrosion cracking comprising the steps of:

(a) forming hot metal weld material on a portion of a substrate;

(b) simultaneously plastically compressively stressing and cooling the hot metal weld material from an external source while the temperature of the hot metal weld material lies substantially within the predetermined temperature range;

(c) performing step (b) until the temperature of the weld material is below the predetermined temperature range or until residual stresses are sufficiently low to minimize or preclude cracking in the completed weld;

(d) wherein the step of plastically compressively straining is performed by periodically impacting the surface of the hot metal weld material while cooling to plastically deform the surface; and (e) wherein the step of plastically compressively straining further includes impacting multiple pins against the weld surface and flowing a cooling medium through the pins.

10. A method of welding materials while the materials are in a predetermined temperature range to minimize or eliminate post-weld stress corrosion cracking comprising the steps of:

(a) forming hot metal weld material on a portion of a substrate;

(b) simultaneously plastically compressively stressing and cooling the hot metal weld material from an external source while the temperature of the hot metal weld material lies substantially within the predetermined temperature range;

(c) performing step (b) until the temperature of the weld material is below the predetermined temperature range or until residual stresses are sufficiently low to minimize or preclude cracking in the completed weld;

(d) wherein the step of plastically compressively straining is performed by periodically impacting the surface of the hot metal weld material while cooling to plastically deform the surface; and (e) wherein the step of plastically compressively straining further includes periodically impacting multiple pins against the weld surface by engaging a roller mounting said pins against the weld surface.

* * * * *